United States Patent
Sakraschinsky et al.

(10) Patent No.: US 10,143,945 B2
(45) Date of Patent: Dec. 4, 2018

(54) FILTER DEVICE

(71) Applicant: Hydac Filtertechnik GmbH, Sulzbach/Saar (DE)

(72) Inventors: Michael Sakraschinsky, St. Ingbert (DE); Sebastian Fiedler, Spiesen-Elversberg (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 284 days.

(21) Appl. No.: 14/433,425

(22) PCT Filed: Oct. 11, 2013

(86) PCT No.: PCT/EP2013/003069
§ 371 (c)(1),
(2) Date: Apr. 3, 2015

(87) PCT Pub. No.: WO2014/060084
PCT Pub. Date: Apr. 24, 2014

(65) Prior Publication Data
US 2015/0258473 A1    Sep. 17, 2015

(30) Foreign Application Priority Data

Oct. 18, 2012 (DE) ......................... 10 2012 020 431

(51) Int. Cl.
*B01D 29/60* (2006.01)
*B01D 29/15* (2006.01)
*B01D 29/21* (2006.01)

(52) U.S. Cl.
CPC ........... *B01D 29/606* (2013.01); *B01D 29/15* (2013.01); *B01D 29/21* (2013.01); *B01D 2201/403* (2013.01)

(58) Field of Classification Search
None
See application file for complete search history.

(56) References Cited

U.S. PATENT DOCUMENTS

| | | | | |
|---|---|---|---|---|
| 1,059,370 A | * | 4/1913 | Johnson | .................... E03B 7/10 138/28 |
| 2003/0209484 A1 | * | 11/2003 | Klotz | ..................... B01D 29/21 210/450 |

(Continued)

FOREIGN PATENT DOCUMENTS

| | | |
|---|---|---|
| DE | 2 121 533 A1 | 11/1972 |
| DE | 10 2006 003 551 A1 | 9/2006 |

(Continued)

*Primary Examiner* — Krishnan S Menon
*Assistant Examiner* — Bradley R Spies
(74) *Attorney, Agent, or Firm* — Wenderoth, Lind & Ponack, L.L.P.

(57) ABSTRACT

A filter device includes a filter element (3), through which a fluid to be purified can flow at a determinable fluid operating pressure, and which can be accommodated in a housing (1). The fluid pressure prevailing at the respective filter element (3) may exhibit pressure increases or pressure peaks, which are damaging to the filter element (3), and in particular to its filter material (9), and which can be reduced and/or smoothened by a compensation device acting directly on the filter element (3) and having a flexible compensation element (29) that enables the volume of the fluid chamber of the housing (1) to be increased in accordance with a pressure peak or pressure increase. The flexible compensation element (29) is arranged between the outer side of the filter material (9) of the filter element (3) and the adjacent inner wall of the housing (1).

25 Claims, 3 Drawing Sheets

(56) References Cited

U.S. PATENT DOCUMENTS

| | | | |
|---|---|---|---|
| 2005/0161394 A1 | 7/2005 | Fritze et al. | |
| 2010/0163477 A1* | 7/2010 | Noh | B01D 35/153 210/236 |
| 2012/0132582 A1* | 5/2012 | Gluck | B01D 35/31 210/350 |
| 2012/0144808 A1* | 6/2012 | Fuchs | F01N 3/2066 60/287 |
| 2012/0248024 A1 | 10/2012 | Wells et al. | |
| 2014/0076794 A1* | 3/2014 | Sakraschinsky | B01D 29/52 210/323.2 |

FOREIGN PATENT DOCUMENTS

| | | | | |
|---|---|---|---|---|
| DE | 10 2009 009 899 A1 | 8/2010 | | |
| DE | 10 2010 061 222 A1 | 6/2012 | | |
| DE | 102011013186 A1 * | 9/2012 | ............. | B01D 29/52 |
| EP | 1 360 983 A1 | 11/2003 | | |
| EP | 2 228 113 A1 | 9/2010 | | |
| WO | WO 2010/139706 A1 | 12/2010 | | |
| WO | WO 2012/007337 A1 | 1/2012 | | |
| WO | WO 2013/178336 A1 | 12/2013 | | |
| WO | WO 2013/178352 A1 | 12/2013 | | |

\* cited by examiner

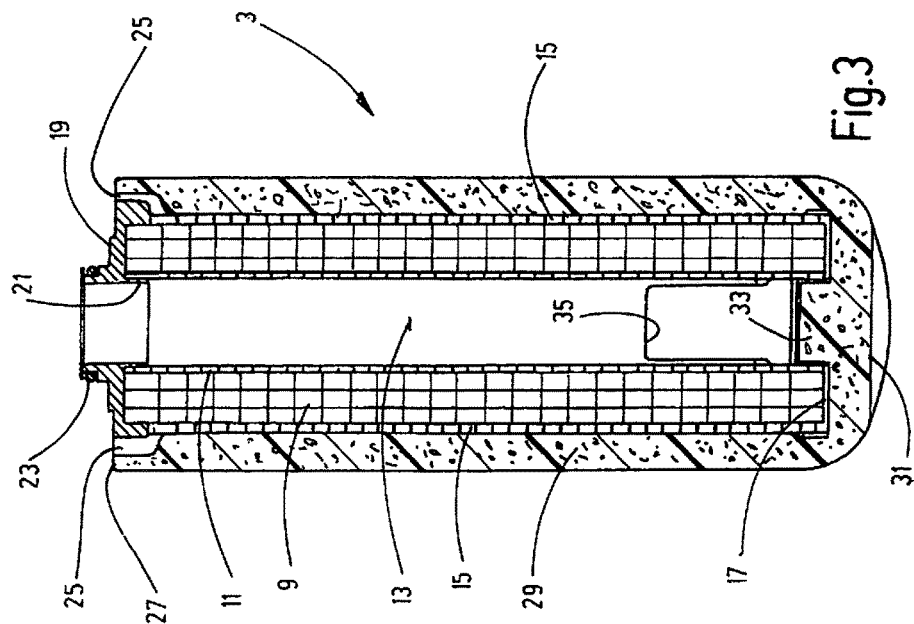
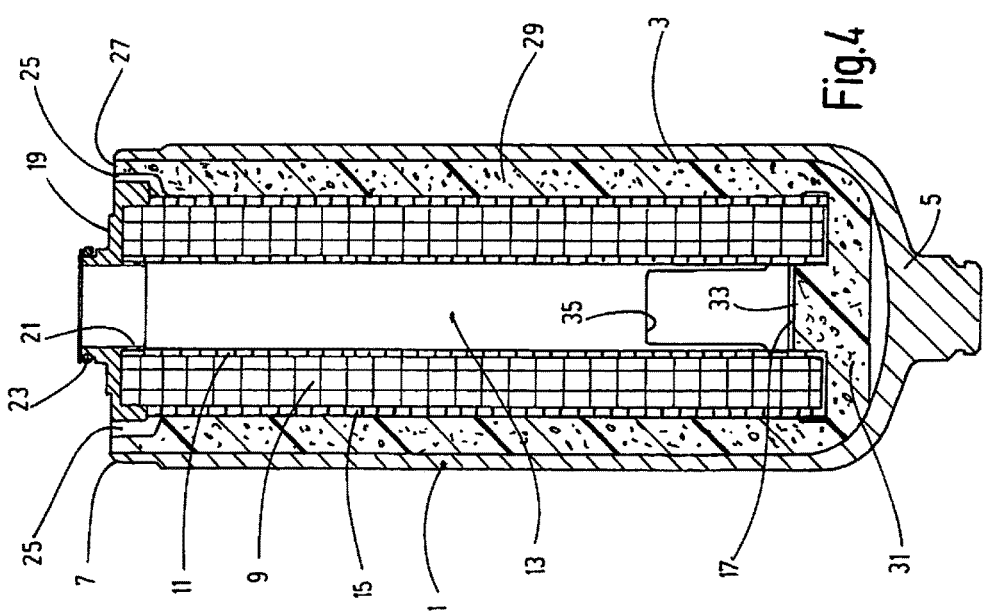

FILTER DEVICE

FIELD OF THE INVENTION

The invention relates to a filter device having at least one filter element, through which a fluid that is to be cleaned can flow at a predefinable fluid operating pressure, and which can be accommodated in a housing. The fluid pressure prevailing at the respective filter element may exhibit pressure peaks or general pressure increases, which are damaging to the respective filter element and in particular, to the filter material thereof. The pressure peaks and increases can be reduced and/or leveled out by a compensation device, which acts directly on the respective filter element, and which has at least one flexible compensation element making it possible to increase the volume of the fluid chamber of the housing in accordance with a pressure peak or pressure increase.

BACKGROUND OF THE INVENTION

Filter devices having at least one filter element, which can be accommodated in a housing, through which filter element fluid can flow at a corresponding system pressure or fluid operating pressure, are commercially available and are widely used, for example in the case of hydraulic systems in system branches, through which hydraulic fluid flows. To achieve a pressure-stable design of the respective filter element, as a rule a support tube, preferably made out of a plastic material, is provided. The support tube provided with perforations and provides the support for the inserted filter material against the predefined direction of flow of the fluid. In the case of a filter device known from DE 10 2008 004 344 A1, the filter material, as a pleated filter mat, is placed about a fluid-permeable support tube, and the respective filter element is provided with end caps.

In the operation of a filter device, in particular in hydraulic systems, depending on the application, greater pressure pulsations or pressure peaks may arise. As a result, the fluid pressure prevailing locally at the respective filter element may deviate from the predefined fluid operating pressure and, in particular, may exceed that pressure resulting in damage to the filter element, in particular the inserted filter material. Pressure pulsations of this kind occur in particular in hydraulic systems having quick-closing valves or having piston pumps. When such pressure pulsations arise, the contaminate pick-up required of the respective filter element and the correspondingly adjusted filtration grade may, at times, be affected. Should this situation arise, this situation may lead to a deterioration of the filter material.

To counter this hazard, in the prior art, pressure fluctuations that arise are smoothed out by a flexible compensation device; cf. the document, U.S. Published Patent Application No. 2009/0218295 A1. In the case of this known solution, the flexibility of the compensation device permits modifying the volume located inside a filter housing, which accommodates a respective filter element. Among other things, the known solution is not satisfactory insofar as the installation space needed for the compensation device inside the filter housing is comparatively larger, so that a compact design cannot be implemented.

SUMMARY OF THE INVENTION

An object of the invention is to provide an improved filter device, which better meets the requirements placed thereon and, in particular, makes a compact design possible.

This object is basically achieved according to the invention by a filter device having, as an essential special feature of the invention, a flexible compensation element disposed between the outside of the filter material of the filter element and the adjacent inner wall of the housing. In contrast to the above-mentioned, known solution, in which the output device is connected as an axial extension to the end of the filter element, the invention permits designing the filter device of this kind in such a way that the overall length of the housing does not substantially exceed the overall length of the filter element.

A particularly compact design can be implemented when the flexible compensation element is formed by an at least partial casing of the outside of the filter element, which is located in the housing.

Especially advantageously a casing may be formed by a body having a predefined compressibility. This body may preferably be a porous material having closed pores, for example a foam. In the case of an especially advantageous embodiment, a casing made out of foam rubber, preferably an ethylene propylene diene monomer rubber (EPDM), is provided. A casing of this kind provides a particularly beneficial balance between unloaded volume size and compressed volume size.

In the case of especially advantageous embodiments having a filter element, which has a filter material that encases a hollow-cylindrical, inner filter cavity, which material is enclosed at the end by an end cap that forms the inlet and the outlet of the fluid chamber, the configuration is advantageously such that the casing completely encompasses the filter element, leaving the end cap at least partially free. An optimal compensation effect can thereby be achieved with a minimum size limit on the additional installation space required for the compensation device.

Particularly advantageously the casing has the form of a circular-cylindrical bowl. The inside of the bowl rests against a support tube, which, in turn, rests against the outside of the filter material of the relevant filter element as the outer support tube thereof. In the case of a pressure increase or pressure peak in the inner fluid chamber of the filter element, the volume of this chamber is increased by compressing the casing by pressure, which is applied to the outer support tube.

In especially advantageous embodiments, the outside of the bowl of the casing rests against the inside of the housing, which can, however, be removed from the housing together with the filter element as a unit, if a state arises in which there is an absence of fluid operating pressure. Because the bowl, together with the filter element, can be removed from the housing during a replacement procedure, there is an additional, significant advantage that the replacement of the filter can be done in a convenient, clean and environmentally friendly manner. When the filter element is removed, residual fluid and deposits are removed with the bowl of the casing. As a result, neither the housing nor the environment are placed at risk during the handling of used filter elements.

An additional, special advantage of the invention is that, in addition to damping pressure pulsations, the compensation device forms a freeze protection for the filter device. This protection is of significance when it comes to fluids in the form of substances that can freeze. This situation occurs in the case of those systems used in automotive engineering that are referred to in technical terms as AdBlue systems, for example. In these systems, aqueous urea solutions are supplied to the flow of exhaust gas in measured amounts from a supply tank, via a feeding system for exhaust treatment in the case of combustion engines. Ammonia is obtained from the urea by hydrolysis. This ammonia acts as a selective reducing agent in the flow of exhaust gas. To optimize the efficiency of the reduction, the aqueous urea solution is supplied to the flow of exhaust gas in a measured dose by a pump, which is load-dependently controlled by a control device. In the case of a urea solution that is supplied by a piston pump, which, because of the system, is subject to pressure pulsations. On the one hand, the compensation device exerts a smoothing effect. On the other hand, as freeze protection, the compensation device prevents the walls of the filter device from bursting due to an increase in volume as a result of a freezing process. Therefore, upon the conditional freezing of the urea solution, the compensation device prevents damage to or the deterioration of a respective filter element because the compensation device compensates for an increase in volume as a result of freezing.

The subject matter of the invention is also a filter element, which in particular, is provided for use in a filter device according to the invention.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIG. 3 is a side view in section of the filter element shown in FIG. 2;

FIG. 4 is a side view in section of the embodiment of the filter device, wherein the filter element from FIGS. 2 and 3 has been accommodated in the associated filter housing.

DETAILED DESCRIPTION OF THE INVENTION

Figure 1:
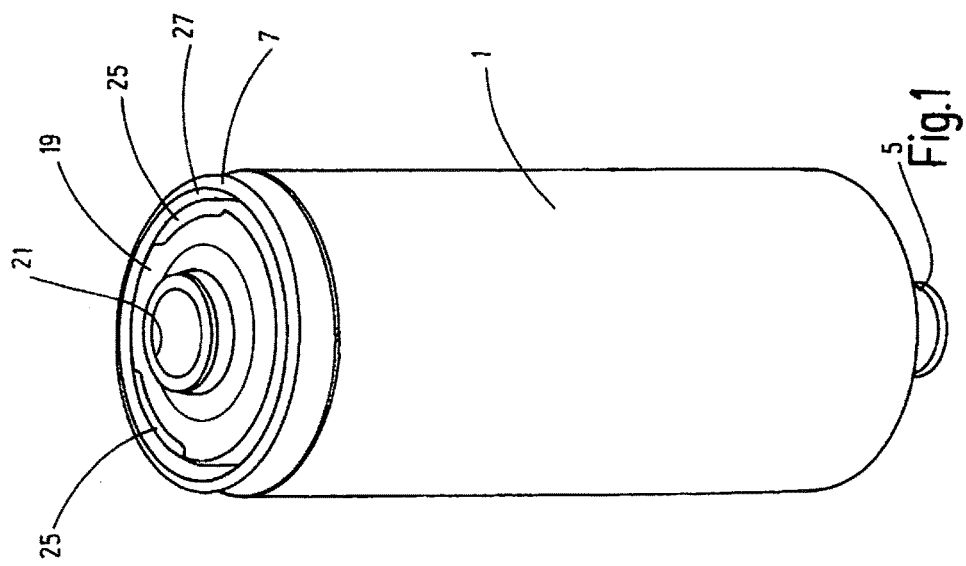
FIG. 1 is a perspective view of a filter device according to an exemplary embodiment of the invention, viewed from the end cap of an associated filter element.
Figure 2:
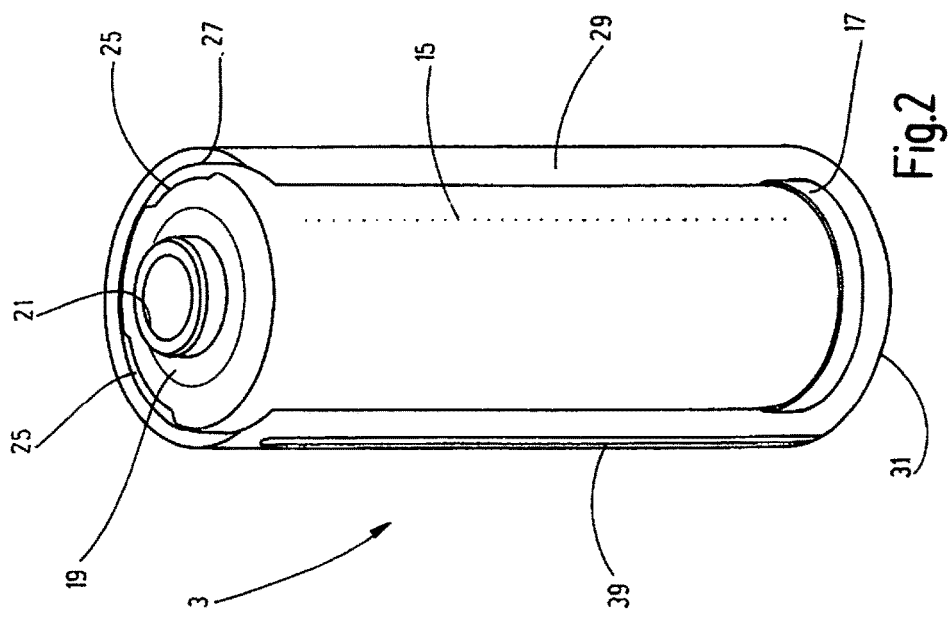
FIG. 2 is a perspective view of only the filter element of the embodiment of FIG. 1 viewed from the end cap thereof, and having a partial cutaway of the casing so that a part of the outside of the filter material of the filter element is visible.
Figure 5:
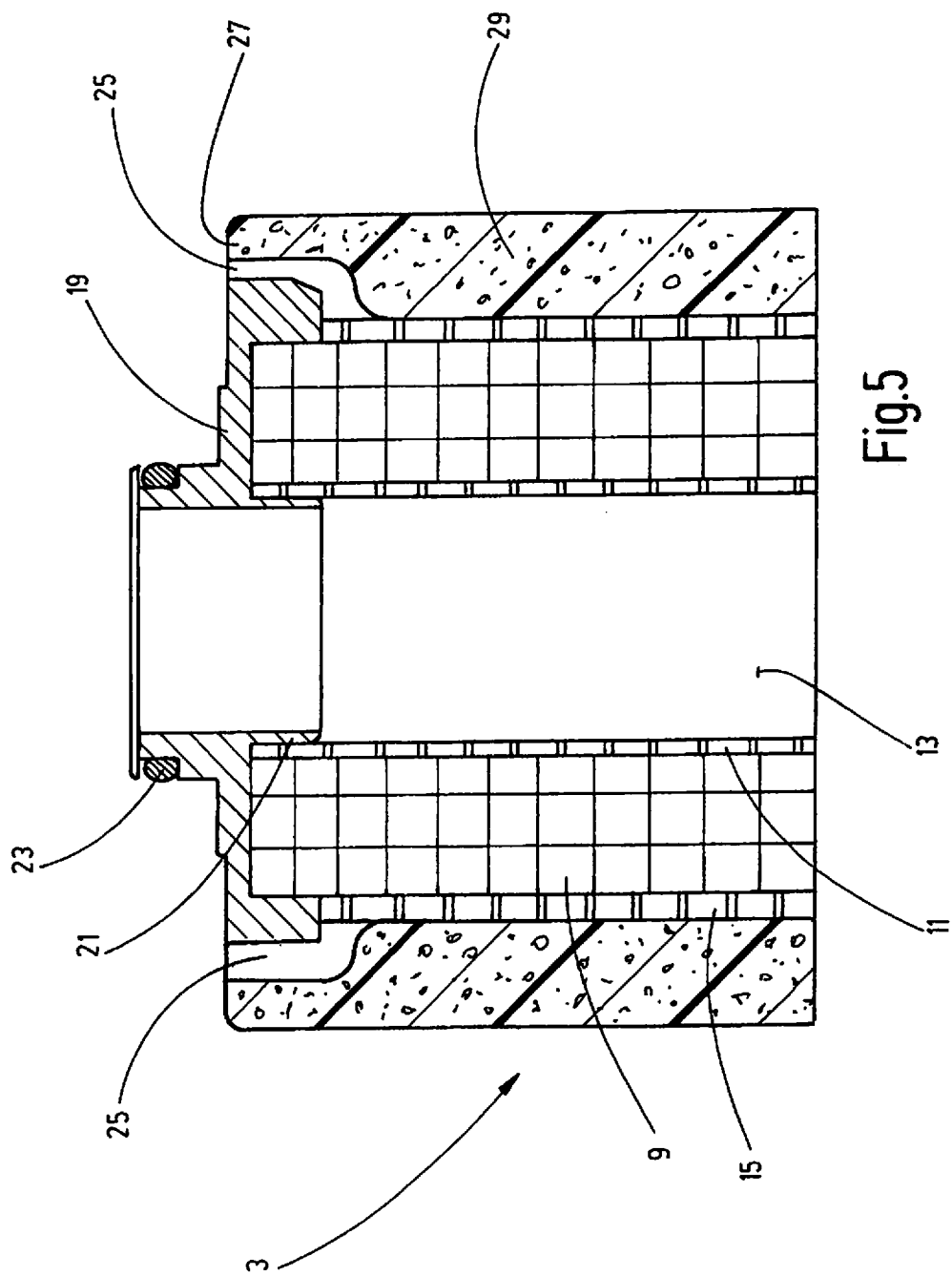
FIG. 5 is a partial side view in section of only the region of the filter element that is adjacent to the end cap, which has been enlarged as compared to FIG. 3.

The exemplary embodiment of the filter device according to the invention shown as a whole in FIGS. 1 and 4, and shown in a sectional view in the case of the latter Figure, has a filter housing 1 provided to accommodate the filter element 3, which is shown separately in FIGS. 2 and 3, and shown in a sectional view in the case of the latter Figure. The filter housing 1, which is made out of a plastic or a metal material, has the shape of a hollow cylinder, which is closed at the bottom 5, and which is open at the opposite, upper end 7. The filter element 3, which can be inserted into the filter housing from the open end 7, which filter element is formed in the manner of a filter cartridge, has a filter material 9 in the form of a pleated filter mat, which, in the manner that is customary for such filter cartridges, encloses a fluid-permeable support tube 11, preferably made out of plastic, within which support tube an inner filter cavity 13 is located. A second, external, fluid-permeable support tube 15 is located on the outside of the filter material 9. The filter material 9 is enclosed at the lower end in the drawing by a closed end cap 17. Located at the other end of the filter material 9 is an end cap 19, at which a connection is made to an associated filter head (not shown). By that filter head, a fluid that is to be cleaned is supplied, and the cleaned fluid is discharged. The end cap 19, like the closed end cap 17, is made as a single piece out of a plastic material using injection molding, and has a connection fitting 21 for a fluid connection to the inner filter cavity 13. At that fitting 21, an O-ring 23 is located to form a seal at the filter head.

As can most clearly be seen in FIGS. 1 and 2, the end cap 19 does not have a completely circular profile, but rather has recesses extending inward in a radial direction. As a result, annular gaps 25 are formed on the circumference of the end cap 19 between the end cap 19 and the edge 27 of a casing, which encloses the end cap 19. This casing has the form of a bowl 29, which extends from the open edge 27 thereof to a closed bottom part 31, forming a circular cylinder. In the functional position, in which the bowl 29 is accommodated in the filter housing 1, the bottom part 31 of the bowl 29 is located at the bottom 5 of the housing 1 (see FIG. 4). Like the connection fitting 21, the gaps 25 form the fluid connection from the filter head, which is not shown, to the inner fluid chamber of the filter element 3. The direction of flow in the case of a filtering process may be provided in such a way that the fluid that is to be cleaned flows in via the connection fitting 25, is distributed along the support tube 15 and, after passing through the filter material 9, is discharged via the connection fitting 21 of the end cap 19.

The bowl 29 is closed at the bottom part 31, forms a casing that completely encloses the filter element 3 up to the upper end cap 19, and is made out of a compressible material. In the functional position, the filter element 3 is accommodated in the housing 1 (see FIG. 4) in such a way that the smooth outer surface of the bowl 29 that forms the casing rests against the likewise smooth inner wall of the housing 1. The bowl 29 forms an effective compensation device due to the flexibility thereof. Bowl 29 permits an increase in the volume of the fluid chamber in the filter element 3 as a result of a pressure-dependent compression of the material of the bowl 29. This compression compensates for pressure increases or smooths out pressure peaks. Materials that are preferably porous, compressible materials having closed pores, are considered as materials for the bowl 29 and are suitable for pressing against the inner wall of the housing 1. In the case of the present embodiment, the bowl 29, which serves as a casing, is formed out of a foam rubber, preferably an ethylene propylene diene monomer rubber (EPDM). As shown in FIGS. 3 and 4, the bowl 29 is a single-piece component having a protuberance 33 that extends axially inward from the bottom part 31 as a centering piece for the closed lower end cap 17. A stabilizing element 35 extends from that lower cap into the inner filter cavity 13.

As already mentioned, the outside of the bowl 29, which forms the casing, and the inner wall of the filter housing 1 are smooth. The dimensioning of the filter element 3 and housing 1 is such that the filter element 3 can be inserted into the housing 1 from the open end 7 of the housing. To allow easy insertion and removal, three recessed, longitudinal grooves 29, which are offset to one another at intervals of 120°, are formed in the outside of the bowl 29 as an interruption to the otherwise smooth outer surface, of which grooves only one is visible in FIG. 2. These longitudinal grooves 29 permit a corresponding pressure equalization when the filter element 3 is inserted into the housing 1 and when the filter element 3 is removed from the housing 1 when the filter element is exchanged. Due to the casing, which is formed by a bowl 29 that is closed at the bottom part 31 thereof, residual fluids and deposited materials remain within the bowl 29 when a filter element 3 that is to be exchanged is removed. The bowl thereby serves as a container for contaminated media. Contamination of the housing during changing processes is thereby avoided. The operating fluids coming into contact with the wall of the housing 1 during the filtering process is also prevented by the fact that the bowl 29 is pressed against the inner wall of the housing 1 by the system pressure that prevails there during the filtration process.

While one embodiment has been chosen to illustrate the invention, it will be understood by those skilled in the art that various changes and modifications can be made therein without departing from the scope of the invention as defined in the claims.

The invention claimed is:

1. A filter device, comprising:
a filter housing having an inner wall and an inner chamber with a volume;
a filter element through which fluid to be cleaned can flow at a predefinable fluid operating pressure at said filter element, said filter element being located in said filter housing and being subjectable to pressure peaks or general pressure increases that are damaging to said filter element and to a filter material of said filter element, said filter element having an outer support tube resting directly on an outer surface of said filter material and having an inner support tube resting directly on an inner surface of said filter material; and
a flexible compensation element reducing the pressure peaks and the pressure increases, acting directly on said filter element and increasing the volume of said inner chamber of said housing in accordance with the pressure peaks or the pressure increases, said flexible compensation element being disposed between an outer surface of said filter material and said inner wall of said housing and forming at least a partial casing on said outer surface of said filter element, said casing being a circular-cylindrical bowl having an inside surface resting directly against an outer surface of said outer support tube.

2. A filter device according to claim 1 wherein
said casing has a predefined compressibility.

3. A filter device according to claim 1 wherein
said casing is made of a porous material having closed pores.

4. A filter device according to claim 3 wherein
said porous material is foam.

5. A filter device according to claim 4 wherein
said foam is foam rubber.

6. A filter device according to claim 5 wherein
said foam rubber is ethylene propylene diene monomer rubber.

7. A filter device according to claim 1 wherein
said filter material encases a hollow-cylindrical inner filter cavity enclosed at an end thereof by an end cap forming an inlet and an outlet of said filter element; and
said casing completely encompasses said filter element leaving said end cap at least partially free.

8. A filter device according to claim 1 wherein
an outside of said bowl rests directly against said inner wall of said filter housing, said bowl being removable from said filter housing together with said filter element as a single unit upon an absence of fluid operating pressure.

9. A filter element, comprising:
a filter material;
an inner support tube resting directly on an inner surface of said filter material;
an outer support tube resting directly on an outer surface of said filter material; and
a casing made of compressible material at least partially encompassing said filter material and said outer support tube, said casing being a circular-cylindrical bowl having an inside surface resting directly against an outer surface of said outer support tube.

10. A filter element according to claim 9 wherein
said casing is made of a porous material having closed pores.

11. A filter element according to claim 10 wherein
said porous material is foam.

12. A filter element according to claim 11 wherein
said foam is foam rubber.

13. A filter element according to claim 9 wherein
said filter material encases a hollow-cylindrical inner filter cavity enclosed at an end thereof by an end cap forming an inlet and an outlet of said filter element; and
said casing completely encompasses said filter element leaving said end cap at least partially free.

14. A filter element according to claim 9 wherein
said casing comprises longitudinal grooves on an outer surface thereof.

15. A filter device according to claim 1 wherein
said casing comprises longitudinal grooves on an outer surface thereof.

16. A filter device according to claim 1 wherein
said circular cylindrical bowl is closed at one end thereof by a bottom part, completely encloses said filter element from a bottom end of said filter element to an upper end cap at upper end of said filter element, and is made of a compressible material.

17. A filter element according to claim 9 wherein
said circular cylindrical bowl is closed at one end thereof by a bottom part, completely encloses said filter material from a bottom end of said filter material to an upper end cap at upper end of said filter material, and is made of a compressible material.

18. A filter device according to claim 16 wherein
said bottom part comprises an integral protuberance extending axially into an opening in a bottom cap of said filter element and into a hollow interior of said filter element.

19. A filter element according to claim 17 wherein
said bottom part comprises an integral protuberance extending axially into an opening in a bottom cap on said filter material and into a hollow interior of said filter material.

20. A filter device according to claim 1 wherein
radial extending gaps extend between said casing and at open end thereof and an adjacent end cap of said filter element.

21. A filter element according to claim 9 wherein
radial extending gaps extend between said casing and at open end thereof and an adjacent end cap on said filter material.

22. A filter device, comprising:
a filter housing having an inner wall and an inner chamber with a volume;
a filter element through which fluid to be cleaned can flow at a predefinable fluid operating pressure at said filter element, said filter element being located in said filter housing and being subjectable to pressure peaks or general pressure increases that are damaging to said filter element and to a filter material of said filter element, said filter element having an outer support tube resting directly on an outer surface of said filter material; and a flexible compensation element reducing the pressure peaks and the pressure increases, acting directly on said filter element and increasing the volume of said inner chamber of said housing in accordance with the pressure peaks or the pressure increases, said flexible compensation element being disposed between an outer surface of said filter material and said inner wall of said housing and forming at least a partial casing on said outer surface of said filter element, said casing being a circular-cylindrical bowl having an inside surface directly contacting an outer surface of said outer support tube and having an outer surface directly contacting said filter housing.

23. A filter device, comprising:

a filter housing having an inner wall and an inner chamber with a volume;

a filter element through which fluid to be cleaned can flow at a predefinable fluid operating pressure at said filter element, said filter element being located in said filter housing and being subjectable to pressure peaks or general pressure increases that are damaging to said filter element and to a filter material of said filter element, said filter element having an outer support tube resting directly on an outer surface of said filter material;

a flexible compensation element reducing the pressure peaks and the pressure increases, acting directly on said filter element and increasing the volume of said inner chamber of said housing in accordance with the pressure peaks or the pressure increases, said flexible compensation element being disposed between an outer surface of said filter material and said inner wall of said housing and forming at least a partial casing on said outer surface of said filter element, said casing being a circular-cylindrical bowl having an inside surface resting directly against an outer surface of said outer support tube; and radially extending gaps in said bowl at a top end of said filter element.

24. A filter device, comprising:

a filter housing having an inner wall and an inner chamber with a volume;

a filter element through which fluid to be cleaned can flow at a predefinable fluid operating pressure at said filter element, said filter element being located in said filter housing and being subjectable to pressure peaks or general pressure increases that are damaging to said filter element and to a filter material of said filter element, said filter element having an outer support tube resting directly on an outer surface of said filter material;

a flexible compensation element reducing the pressure peaks and the pressure increases, acting directly on said filter element and increasing the volume of said inner chamber of said housing in accordance with the pressure peaks or the pressure increases, said flexible compensation element being disposed between an outer surface of said filter material and said inner wall of said housing and forming at least a partial casing on said outer surface of said filter element, said casing being a circular-cylindrical bowl having an inside surface resting directly against an outer surface of said outer support tube; and a hollow space between a bottom of said bowl and said filter housing providing space for fluid expansion in case of freezing of fluid.

25. A filter device, comprising:

a filter housing having an inner wall and an inner chamber with a volume;

a filter element through which fluid to be cleaned can flow at a predefinable fluid operating pressure at said filter element, said filter element being located in said filter housing and being subjectable to pressure peaks or general pressure increases that are damaging to said filter element and to a filter material of said filter element, said filter element having an outer support tube resting directly on an outer surface of said filter material;

a flexible compensation element reducing the pressure peaks and the pressure increases, acting directly on said filter element and increasing the volume of said inner chamber of said housing in accordance with the pressure peaks or the pressure increases, said flexible compensation element being disposed between an outer surface of said filter material and said inner wall of said housing and forming at least a partial casing on said outer surface of said filter element, said casing being a circular-cylindrical bowl having an inside surface resting directly against an outer surface of said outer support tube; and longitudinal grooves on an outer surface of said bowl facilitating insertion of said bowl in said filter housing.

* * * * *